(12) United States Patent
Breuer

(10) Patent No.: US 11,700,557 B2
(45) Date of Patent: Jul. 11, 2023

(54) METHOD FOR SELECTION OF A BASE STATION FOR OPERATING IN UNLICENSED SPECTRUM

(71) Applicant: Telit Cinterion Deutschland GmbH, Munich (DE)

(72) Inventor: Volker Breuer, Botzow (DE)

(73) Assignee: Telit Cinterion Deutschland GmbH, Munich (DE)

( * ) Notice: Subject to any disclaimer, the term of this patent is extended or adjusted under 35 U.S.C. 154(b) by 0 days.

(21) Appl. No.: 17/266,494

(22) PCT Filed: Aug. 6, 2019

(86) PCT No.: PCT/EP2019/071084
§ 371 (c)(1),
(2) Date: Feb. 5, 2021

(87) PCT Pub. No.: WO2020/030624
PCT Pub. Date: Feb. 13, 2020

(65) Prior Publication Data
US 2021/0306920 A1    Sep. 30, 2021

(30) Foreign Application Priority Data
Aug. 8, 2018   (EP) .................................... 18188078

(51) Int. Cl.
*H04W 4/00*     (2018.01)
*H04W 36/00*    (2009.01)
(Continued)

(52) U.S. Cl.
CPC .... *H04W 36/00837* (2018.08); *H04B 17/318* (2015.01); *H04W 36/0058* (2018.08); *H04W 36/00835* (2018.08); *H04W 36/08* (2013.01)

(58) Field of Classification Search
CPC .... H04B 17/30; H04B 17/309; H04B 17/318; H04B 17/327; H04B 17/336;
(Continued)

(56) References Cited

U.S. PATENT DOCUMENTS 10,548,181 B2 * 1/2020 Siomina ................ H04W 48/16
2018/0343638 A1 * 11/2018 Balasubramanian ........................
H04W 74/0825
(Continued)

FOREIGN PATENT DOCUMENTS

WO    2015105440 A1    7/2015

OTHER PUBLICATIONS

International Search Report (PCT/ISA/210) and Written Opinion (PCT/ISA/237) dated Sep. 11, 2019, by the European Patent Office as the International Searching Authority for International Application No. PCT/EP2019/071084.
(Continued)

*Primary Examiner* — Matthew W Genack
(74) *Attorney, Agent, or Firm* — Pearl Cohen Zedek Latzer Baratz LLP

(57) ABSTRACT

A method for a user equipment maintaining a first set of configuration parameters includes: measuring strength of signals transmitted by a first base station, measuring strength of signal transmitted by at least one of a set of neighbor base stations operating in unlicensed spectrum, determining a second set of configuration parameters corresponding to the cellular network for a second base station in a set of neighbor base stations, by retrieving said set of configuration parameter from said second base station, considering the second base station for cell re-selection when: the measured signal strength for the second base station is higher than said measured signal strength of first base station, and said determined second set of configuration
(Continued)

parameters corresponds to said first set of configuration parameters, and carrying out a cell selection to said second base station when these conditions are met.

10 Claims, 3 Drawing Sheets

(51) Int. Cl.
*H04B 17/318* (2015.01)
*H04W 36/08* (2009.01)

(58) Field of Classification Search
CPC ......... H04W 36/0005; H04W 36/0022; H04W 36/0058; H04W 36/0072; H04W 36/0083; H04W 36/00835; H04W 36/00837; H04W 36/0085; H04W 36/0088; H04W 36/0094; H04W 36/08; H04W 36/16; H04W 36/165; H04W 36/18; H04W 36/24; H04W 36/30
See application file for complete search history.

(56) References Cited

U.S. PATENT DOCUMENTS

2019/0268817 A1* 8/2019 Seo ................ H04W 36/08
2020/0053583 A1* 2/2020 Määttänen ............ H04W 24/10

OTHER PUBLICATIONS

Qualcomm Incorporated: "Mobility and RLM for NR unlicensed", 3GPP Draft; R2-1810325_Mobility_RLM, 3rd Generation Partnership Project (3GPP), France, Jul. 1, 2018, retrieved from the internet—http://www.3gpp.org/ftp/Meetings%5F3GPP%5FSYNC/RAN2/Docs (4 pages).

Qualcomm Incorporated: "Report of Email Discussion [101 bix#49] [NR] NR unlicensed SI (Qualcomm)", 3GPP Draft; R2-1808740_Report_Email_Discussion_NRU, 3rd Generation Partnership Project (3GPP), France, May 20, 2018, retrieved from the internet—http://www.3gpp.org/ftp/Meetings%5F3GPP%5FSYNC/RAN2/Docs/ (20 pages).

Nokia , et al., "Considerations on cell reselection in Idle/Inactive mode for NR-U", 3GPP Draft; R2-1810218 NR-U Idle-Inactive Mobility, 3rd Generation Partnership Project (3GPP), France, Jul. 1, 2018, retrieved from the internet—http://www.3gpp.org/ftp/Meetings%5F3GPP%5FSYNC/RAN2/Docs (3 pages).

* cited by examiner

METHOD FOR SELECTION OF A BASE STATION FOR OPERATING IN UNLICENSED SPECTRUM

CROSS-REFERENCE TO RELATED APPLICATIONS

This application is a National Phase Application of PCT International Application No. PCT/EP2019/071084, International Filing Date Aug. 6, 2019, claiming the benefit of European Patent Application No. 18188078.2 filed on Aug. 8, 2018, all of which are hereby incorporated by reference in their entirety.

FIELD OF THE INVENTION

The present invention relates to a method for selection and re-selection of a base station for operating in unlicensed spectrum. The invention also pertains to a user equipment using said method.

The invention further relates to a base station supporting unlicensed spectrum access. The invention also pertains to method for operating said base station.

BACKGROUND OF THE INVENTION

Generally, in the field of wireless communication the wireless technology standard is constantly evolving into the direction of diversification in terms of supported user equipment types. In particular the area of Internet of Things (IoT) provides a vast majority of user equipments with different requirements towards the cellular network support.

The coming fifth generation (5G) standard, currently known under the term "New Radio" is supposed to provide solutions for all those requirements. One of the measures to support different types of user equipments, resp. user equipment use cases, is the variety of frequency ranges supporting the new 5G standard. Higher frequency ranges are designated for high data throughput but low coverage, while in lower frequency ranges it is quite the opposite.

Due to the limited amount of licensed spectrum for many network operators it is meanwhile accepted to allow the usage of unlicensed spectrum in 5G, including for camping and paging of user equipments. Means base stations in unlicensed spectrum may also serve user equipments and they may camp on said base stations whilst in the past unlicensed spectrum has been used from 3GPP perspective rather as a mean to boost capacity for throughput i.e. only when being in connected mode. This has the implication that the same frequency range of unlicensed spectrum may be used by more than one network operator, that is cellular network, at a certain location. By now user equipment knew when receiving signals from a base station in a certain frequency range, to which cellular network the base station belongs, or at least if it is the cellular network the user equipment is currently operating, and thus eligible to operate in. Means intra-frequency cell re-selection was an easy task, as no base station from a different operator within the same country would have been operated on said frequency range.

For a non-stationary user equipment this means that for a cell re-selection there is a need to figure out if the found candidate base station (gNB in 5G wording) belongs to the operator of the serving gNB, that means the gNB the user equipment is currently camping on. Hence the by now valid common boundary conditions are consequently changed, and it needs an approach for the user equipment to cope with that. A cellular network belongs to a network operator and this relation is represented by the PLMN identity provided as part of SIB1 (MNC=Mobile network code).

The conventional approach of synchronizing on a gNB, reading SIBs and then figuring out if it is an appropriate gNB for cell re-selection, is disadvantageous, as it would lead to out of service periods when evaluating cells of a different PLMN, which can last a remarkable duration for which the user equipment is not reachable for paging. Furthermore the user equipment would also waste a remarkable energy budget doing all those evaluations.

Same would be valid when performing inter-frequency cell re-selection into unlicensed spectrum, because also here the one frequency band equals one operator policy would not hold as it has been so far. Even in later not explicitly mentioned same considerations are true for inter-frequency cell re-selection based.

It therefore requires a better solution for carrying out a cell re-selection in unlicensed spectrum, in particular to figure out if the candidate gNB belongs to the good cellular network.

It is therefore the goal of the present invention to overcome the mentioned disadvantages and to propose a solution for an improved cell re-selection of a user equipment when operating in unlicensed spectrum.

Further alternative and advantageous solutions would, accordingly, be desirable in the art.

SUMMARY OF THE INVENTION

For this it is according to a first aspect of the invention suggested a method to operate a user equipment according to some embodiments of the invention. It is further suggested according to a second aspect of the invention a user equipment according to some embodiments of the invention. According to a third aspect of the invention it is proposed a base station according to some embodiments of the invention. It is further suggested according to a fourth aspect of the invention a method for a base station according to some embodiments of the invention.

According to the first aspect of the invention it is proposed a method for a user equipment for operating in a first cellular network supporting unlicensed spectrum access, the user equipment camping on a first base station of the first cellular network, the user equipment maintaining a first set of configuration parameters of the cellular network, the method comprising for the user equipment the steps of:

measuring strength of signals transmitted by the first base station, measuring strength of signal transmitted by at least one of a set of neighbor base stations operating in unlicensed spectrum, determining a second set of configuration parameters corresponding to the cellular network that at least one second base station out of the set of neighbor base stations is part of, by retrieving said set of configuration parameters from said second base station, considering said at least one second base station for cell re-selection under the conditions:

the measured signal strength for said at least one second base station is higher than said measured signal strength of first base station, and said determined second set of configuration parameters corresponds to said maintained first set of configuration parameters, carrying out a cell selection to said second base station when said conditions apply.

The invention affects a user equipment for operation in a cellular network. The user equipment is configured for operating in a cellular network comprising a plurality of base stations. The cellular network is implementing at least one of the cellular technology standards like 5G (New Radio), and/or beyond.

The user equipment is preferably equipped with the necessary circuitry for communicating over the air interface with the base stations, resp. gNodeBs of the cellular network. This comprises in particular transceiver circuitry, including receiving and transmitting capabilities and at least one memory unit.

The user equipment resp. its transceiver is configured to receive and decode signals from base station. Before exchanging signals the user equipment synchronizes with a base station and after a couple of additional steps and checks eventually registers in the cellular network. That means, the user equipment camps on the respective base station. The base station where the user equipment is camping on is called hereinafter the serving base station.

The user equipment is additionally configured for operating with base stations of a cellular network supporting unlicensed spectrum access. The unlicensed spectrum is a frequency range that is not reserved for one network operator in a given region, but many network operators may choose to deploy its base stations for using this frequency range.

Also another emitter may use this range. Hence it is preferable to use also the unlicensed spectrum for camping in idle mode, that means besides dedicated traffic when being connected also paging communication in downlink is used in idle mode. Uplink communication, e.g. TAU messages from the user equipment may also be carried out in unlicensed spectrum frequency ranges.

The usage of unlicensed spectrum is preferable, as it allows network operators that have only license in higher frequency areas, or no frequency ranges at all can make use of this spectrum. This in particular applies e.g. to local company networks, or a separate network for a harbor or plant area.

For a user equipment, in particular when it is operated non-stationary, that means it is moving in space, it is essential to find an appropriate base station, when it should leave the cell area of the serving base station. When the base station and the user equipment agreed to operate in unlicensed spectrum, the issue appears that in the respective frequency range base station signals may be decodable by the user equipment, which do not belong to the cellular network, the user equipment is currently operating in.

By now, the user equipment got indicated through the SIBs of the serving base station in which frequencies resp. channels/carrier neighbor base stations may be detectable. The user equipment could therefore rely, that base station signals on these frequencies were emitted by a base station from the same cellular network provider.

This is not the case when operating in unlicensed spectrum. Hence the user equipment needs to figure out the network operator, where the detected base station belongs to, but without camping on the base station and reading out a cellular network identifier from transmissions of the base station in particular by reading the MCC/MNC contained in the SIB1. This is advantageous as the SIB1 can reach remarkable size, especially when containing a plurality of PLMN Identities.

This is where the inventive method comes into play. According to that when camping on a serving base station, the user equipment determines and maintains a first set of configuration parameters of the cellular network. Such set of configuration parameters comprises of one or more different parameters representing a configuration of the cellular network. Such configuration parameters are in particular alone or in combination with the other parameters of the set of configuration parameters, sufficiently characterizing the cellular network.

The information on said configuration parameter is provided a priori by the serving base station, and also applies to re-selection candidate base stations. With that it is circumvented to read the whole SIB1 content in order to finally evaluate if the base station belongs to said PLMN. Hence, before camping on a base station which might turn out to be provided by another PLMN, a priori elimination of base stations that are not fulfilling said configuration parameter is carried out.

Further the strength of signals transmitted from the serving base station is determined.

When neighbor base stations are detected, hence the cell re-selection decision is on the hand based on the signal strength of the neighbor base stations, and if the configuration parameter retrieved from the neighbor base stations correspond to the maintained configuration parameter of the cellular network, provided a priori by the serving base station.

The configuration parameter is retrieved from the neighbor base stations prior to camping on said base station. It is sufficient to synchronize on its synchronization channel and in particular read the MIB. These are tasks anyhow carried out for neighbor base stations in order to retrieve the signal strength. This assures, that the user equipment is still able to be paged by the serving base station.

According to a preferred embodiment wherein the set of configuration parameters comprises data relating to frame numbering.

In this embodiment the configuration parameter is relating to the system frames.

In particular the master information block (MIB) provides the currently active system frame number (SFN) exactly the most significant bits i.e. the SFN except two least significant bits are contained in the MIB (the two least significant bits are derived from the BCH modification period i.e. being 1, $2^{nd}$, 3rd or $4^{th}$ frame of the BCH modification period). Hence the user equipment can by simply decoding the MIB and receive the most significant SFN bits. The MIB is broadcasted in the center 1.25 MHz of a channel and uses a strong coding with simple modulation. After synchronization on the base station, the user equipment is capable of reading the MIB, and consequently also the system frame number. The system frame number is a numbering of a frame according to the frame structure of the technology standard. A frame consists of 10 subframes of 10 ms. The system frame number runs from 0 to 1023 and starts then again on 0, the 8 most significant bit, except the two least significant bits are coded in the MIB. The two remaining bits are driven from the frame position within the BCH.

Basically the system frame number is base station specific. However many cellular networks synchronize the frame numbering over the cellular network, or at least parts thereof. For detecting frame synchronization for the re-selection process it is deemed sufficient to ensure synchronization of the SFN part contained in the MIB, given that this provides already the possibility of 256 different values, which is considered to be large enough to ensure sufficient low probability that other PLMN accidentally use the same frame synchronization in the SFN part.

In any case, should accidentally in special circumstances it turn out that a base station of another PLMN uses the same frame synchronization—in particular in PLMNs that are not frame synchronized—it will be detected after camping, that the base station belongs to a different PLMN. However, as the invention aims to avoid such situations, it becomes very unlikely that the situation still appears, but if so it can be handled smoothly.

Hence it is further proposed that the user equipment receives from the first base station an indication that the base stations of the cellular network are operating frame synchronized.

With this information received from the base station the user equipment can rely on the fact that system frame numbers are synchronized. Preferably this information is retrieved once, in particular when attaching to the cellular network. It is in particular part of the configuration parameter of the cellular network. This information is only needed from the serving base station, hence it can be provided through SIBs or other network capability messaging.

When the user equipment knows from the serving base station that the system frame number is synchronized then it can use the SFN as valid configuration parameter to identify base stations as belonging to the same cellular network. Typically regularly, in particular permanently the user equipment is trying to decode signals from other base stations. This is in particular the case when the signal strength of the serving base station is below a predetermined threshold, in order to avoid coverage gaps.

Hence the user equipment determines if neighbor base stations are around that provide a stronger signal strength than the serving base station. For measuring the signal strength it preferably synchronizes on the Primary Synchronization Channel and preferably also the Secondary Synchronization Channel and measures the corresponding signal strength of the reference signals. If this is the case, a candidate base station for cell re-selection is found.

With such at least one candidate base station it is according to the inventive method proposed to determine a second set of configuration parameters corresponding to the cellular network the candidate neighbor base station belongs to.

According to the mentioned embodiment wherein one out of the set of configuration parameters relates to frame synchronization it is proposed to determine the system frame number of the candidate base station or at least that part of the SFN which is contained in the MIB.

If this system frame number corresponds to the system frame number of the serving base station, than this indicates with high probability that both base stations are belonging to the same cellular network. This is in particular the case when the user equipment additionally retrieved the information that the system frame number among the base stations of the cellular network is synchronized.

As the system frame number is created by incrementing per frame a number between 0 and 1023, and an overflow to 0 when reaching 1023, therefore it can be derived which is the current SFN from the serving base station, even when it is already a few frames ago since the MIB with the SFN of the serving base station was decoded, in particular when trying to detect the SFN of candidate base stations.

Hence, when the user equipment reads from the serving base station the SFN 255 and 2 frames (2·10·10 ms) later it reads from the candidate base station the SFN 257, then both SFNs correspond.

Or alternatively it knowns the part of the SFN contained in the MIB which is incremented every 4 frames and detects same SFN number in a neighbor base station within the same modification period it is a high probability that this is a suitable candidate base station.

With this detected correspondence of the network configuration parameter of the serving base station and the candidate base station the user equipment may carry out a cell re-selection as both conditions, stronger signal strength and corresponding configuration parameter, apply.

Optionally, as final check the user equipment may still need to read the PLMN-ID in SIB1, however all wrong attempts to base station with non-synchronized SFN can be circumvented which is beneficial. For finally camping on a base station an evaluation whether a service could/would be provided, the barring status needs to be anyway read from SIB1, as well as the scheduling information for all other SIBs. The invention saves to read the SIB1 in vain for a plurality of candidate neighbor base stations, and accordingly it saves power and time and outage time for reading the SIB1.

According to another preferred embodiment the set of configuration parameter comprises data relating to a distribution of reference signals over the frequency spectrum used by the first base station comprising pre-known sequences on specific frequency and/or time occasions.

According to this embodiment another configuration parameter of the cellular network is determined. It refers to the distribution of reference signals in the time and frequency domain of the scheduled transmission. Such reference signals comprise pre-known sequences on specific frequency/time occasions. The distribution is most likely common among the base stations of a cellular network, but different from those of another cellular network.

Means reference signals of the suitable candidates show the same distribution pattern in time and frequency domain as the current serving base station.

Preferably the reference symbol distribution is resulting in a column vector containing the average for each reference signal subcarrier.

Hence, the configuration parameter relating to the reference signals is used for comparing the serving base station and a candidate base station comprising a higher signal strength than the serving base station. Should the reference signal distribution correspond, e.g. by comparing the resulting vectors, the user equipment may carry out a cell re-selection.

In another preferred embodiment it is proposed that the set of configuration parameters comprises the synchronization sequence of at least one of the primary synchronization channel and the second synchronization channel or a combination thereof.

This advantageous embodiment relates to another configuration parameter. As part of this it is suggested to compare the synchronization sequence of the primary or secondary synchronization channel (PSS and SSS).

In NR the PSS has 3 levels and for each of the 3 values 0, . . . , 167 secondary values exist. So PSS/SSS combinations can be used to distinguish networks if minimum co-ordination would happen between the operators. I.e. operators could agree to use different PSS sequences and if this is not sufficient to use only even or odd SSS sequences in relation.

Means operator A uses PSS 1 and even SSS values. Operator B uses PSS1 and odd SSS values, operator C uses PSS 2 and even SSS values.

With this synchronization sequence the user equipment normally detects that a synchronization channel is found. So it is a common configuration parameter of a base station, and consequently eligible for comparison between different base stations, potentially of the same cellular network. Neighbor base stations need to have different PSS/SSS combinations so that they can be reliably distinguished but even with above proposed separation still enough combinations would be possible on a frequency.

It is moreover advantageous to use this configuration parameter as it does not require a full attach, but is already available when the user equipment tries to synchronize—which needs to be done in any case, for retrieving the signal strength of the base station.

This makes the PSS sequence or PSS in combination with SSS to an ideal configuration parameter for comparison of base stations.

In another preferred embodiment it is proposed the step of receiving from the serving base station information relating to an intra-frequency neighbor cell list comprising synchronization sequence combinations used by neighbor base stations belonging to the same cellular network as the serving base station.

With this embodiment it is foreseen to provide the user equipment with combinations of primary synchronization sequence (PSS) and secondary synchronization sequence (SSS) applies to the neighbor base stations of the same PLMN. With that the user equipment is put in the position to detect from determining the respective synchronization sequences of the neighbor base stations during the re-selection procedure. Only those base stations are considered for re-selection that match the received synchronization sequence combinations.

E.g. the received intra-frequency neighbor cell list comprises the value:

| Cell 255: | PSS 1 | SSS 3 |
| Cell 34:  | PSS 1 | SSS 103 |
| Cell 98:  | PSS 1 | SSS 55 |

Hence, when the candidate base stations operating in the unlicensed spectrum comprises base stations that provide none of these synchronization sequence combinations, they can be filtered out from re-selection.

In another preferred embodiment, it is proposed that the set of configuration parameters comprises a combination of at least two of said configuration parameters. With this embodiment it is suggested to combine at least two of the previously mentioned configuration parameters, in order to improve the diagnosis, if a candidate neighbor base station belongs to the same cellular network than the serving base station.

This is in particular advantageous as it increases reliability of this assessment. However, a certainty may in special situations and configuration not be found, e.g. due to the setting of cellular networks, without synchronization of SFN and PSS sequence etc.

As a fallback position, the user equipment preferably is configured also to find an appropriate neighbor base station, even when none of the configuration parameters sufficiently reliable indicates, if it belongs to the same cellular network. Preferably the neighbor base stations are in this case checked one by one through attaching and reading the MNC in the SIB1. In particular the order of neighbor base station in this checks considers the likelihood of belonging to the same cellular network based on the configuration parameter as part of the evaluation procedure.

To summarize, the inventive method according to the first aspect of the invention solves the addressed problem in an advantageous way. This increases the reliability of finding a neighbor base station of the same cellular network as the serving base station, without service and reachability limitations, but as well without excessive power consumption.

According to the second aspect of the invention it is proposed a user equipment for operating in a first cellular network supporting unlicensed spectrum access, the user equipment being configured to camp on a first base station of the first cellular network, and to maintain a first set of configuration parameter of the cellular network, wherein the user equipment is further configured to:

measure strength of signals transmitted by the first base station, measure strength of signal transmitted by at least one of a set of neighbor base stations operating in unlicensed spectrum, determine a second set of configuration parameters corresponding to the cellular network that at least one second base station out of the set of neighbor base stations is part of, by retrieving said set of configuration parameters from said second base station, consider said at least one second base station for cell re-selection under the conditions:

the measured signal strength for said at least one second base station is higher than said measured signal strength of first base station, and said determined second set of configuration parameters corresponds to said maintained first set of configuration parameters, carry out a cell selection to said second base station when said conditions apply.

The user equipment comprises in particular the necessary circuitry for communicating over the air interface with the base stations, resp. gNodeB of a cellular network. This comprises in particular transceiver circuitry, including receiving and transmitting capabilities. According to the circuitry also a separate structural design of transmitting circuitry and receiving circuitry is encompassed by the inventive user equipment. This in particular relates to a radio modem connected to a device appliance.

Further the user equipment advantageously comprises processing circuitry for running software implementing in particular the methods of the first aspect of the invention.

Additionally permanent and/or volatile memory is part of the user equipment, for storing said software executables, configuration data and/or cached data. The second aspect of the invention shares the advantages of the first aspect.

According to the third aspect of the invention it is proposed a base station of a cellular network, configured to support unlicensed spectrum access, further configured to transmit an indication to camping user equipments relating to at least one of a set of configuration parameters of the cellular network.

This aspect of the invention relates to a base station of the cellular network. The cellular network in particular implements the 5G technology standard. The base station is configured to support unlicensed spectrum access.

The base station comprises receiving and transmitting circuitry for setting up a wireless communication link to a plurality of user equipments. This also comprises at least one antenna. It further has communication circuitry for communicating with cellular network components it belongs to.

Additionally the base station comprises processing circuitry for executing software and controlling the receiving/transmitting circuitry. Further a volatile and/or permanent memory unit is preferable.

According to this aspect it is proposed that the base station, in particular instructed by the cellular network, transmits to camping user equipments information relating to configuration parameters. This is in particular helpful for a user equipment camping on the respective base station to determine such configuration parameter.

But this is not limited to that the base station according to this aspect of the invention transmits the configuration parameters itself, but information which help base stations figuring out which configuration parameters are usable for detecting a base station of the same cellular network.

According to one embodiment it is proposed that said indication comprises that the base stations of the cellular network are operating frame synchronized.

With that information a camping user equipment may refer to the system frame number of candidate neighbor base stations when trying to find a better suited base station. The user equipment thus gets in the position to determine the SFN of the serving base station, and then the SFN of candidate base station. If this corresponds, the user equipment can be sure that a base station of the same cellular network is detected.

This allows that the user equipment can rely on the SFN synchronization alone for figuring out if the candidate base station belongs to the same cellular network, and consequently find an appropriate base station for cell re-selection.

According to another embodiment it is proposed for the base station to transmit to at least one camping user equipment information relating to an intra-frequency neighbor cell list comprising synchronization sequence combinations used by at least one neighbor base station belonging to the same cellular network as said base station.

With this embodiment it is proposed that the base station provides an intra-frequency neighbor list comprising the PSS/SSS combinations of the neighboring base stations. With this the camping user equipment has more reliable means to detect if a neighbor base station operating in the unlicensed spectrum belongs to the same cellular network as the serving base station.

The information covered in the intra-frequency neighbor list are in particular collected through Self-Organizing Network (SON) measures.

According to the fourth aspect of the invention it is proposed a method for a base station of a cellular network, configured to support unlicensed spectrum access, comprising the step for the base station of transmitting an indication to camping user equipments relating to at least one of a set of configuration parameters of the cellular network.

This aspect of the invention shares the advantages of the third aspect of the invention.

As it is shown this invention advantageously solves the depicted problem and offers a solution which allows a seamless and power saving way of cell re-selection for base stations operating in unlicensed spectrum.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a user equipment UE of the type to which the present invention is applied to as an embodiment. The user equipment is configured to operate on different base stations BS of different cellular networks respective operators.

Further the user equipment is capable of operating in unlicensed spectrum. That is a frequency spectrum that is not assigned to one network operator for a given region. Hence, in the unlicensed spectrum base stations from more than one network operator may be able to transmit and/or receive data.

Preferably the unlicensed spectrum is used for not-connected signalling, e.g. for paging and all signalling relating to camping in idle mode on a base station. For 5G cellular networks such unlicensed spectrum usage is foreseen, hence the present base stations are in particular gNBs, and the base station capable of operating in the 5G wireless standard with the gNBs.

Figure 1:
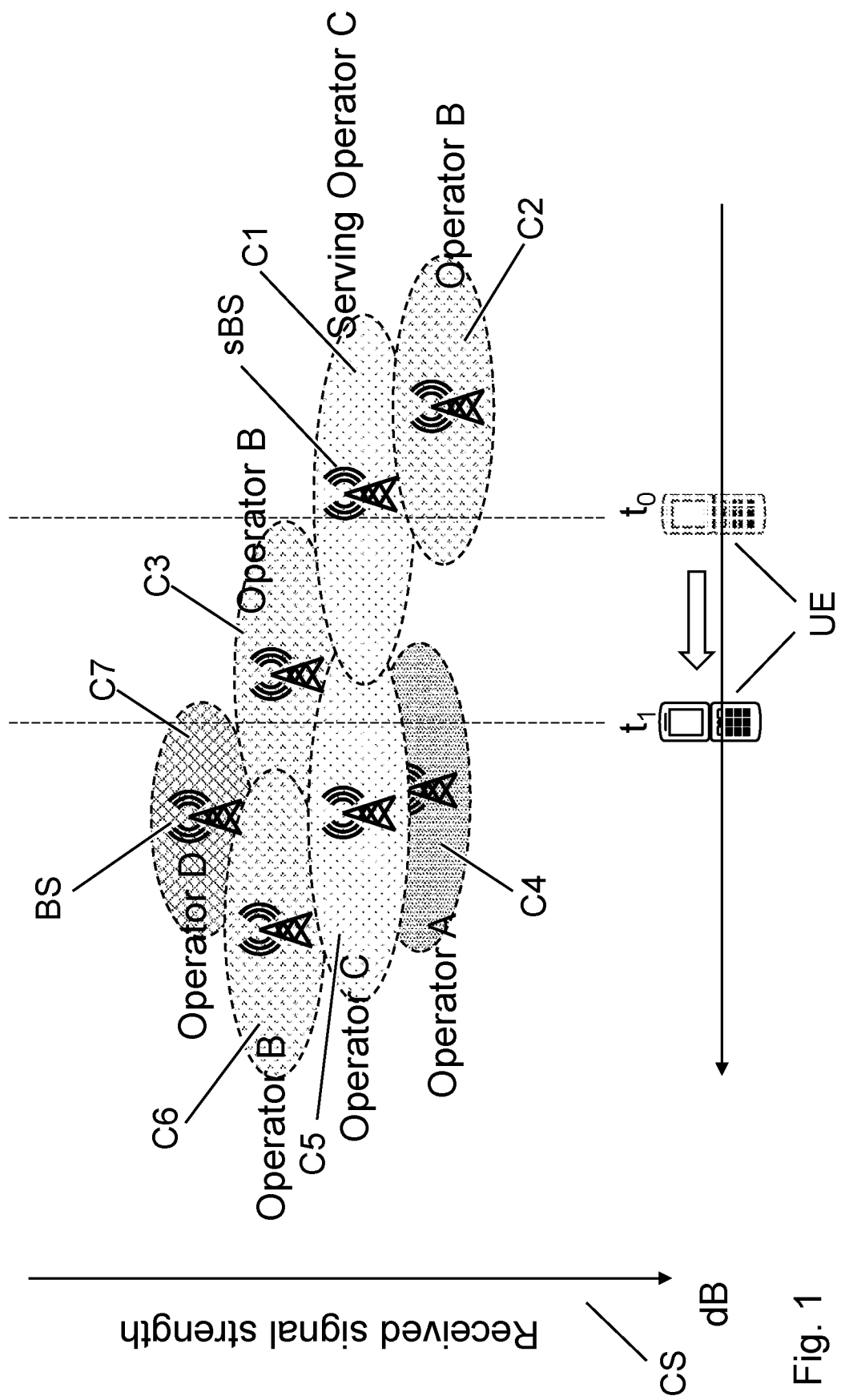
FIG. 1 represents schematically the situation for a user equipment of the type to which the present invention is applied as an embodiment of handling base stations of different cellular networks.

In FIG. 1 it is shown that the user equipment is camping on the serving base station sBS. It has a certain coverage area which is called the cell C1. As it is shown, when the user equipment is moving it is coming in the area of different cell areas C2-C7. The different cell areas belong to different cellular networks operated by the different network operators A-D.

On the ordinate it is shown the received signal strength CS. That means the closer a cell area is shown, the higher is the received signal strength CS of the respective gNB at the antenna of the user equipment received. It is assumed that all shown gNBs operate in the same unlicensed spectrum frequency range for paging and camping of the user equipment.

The different type of filling pattern per cell areas indicates to which network operator a cell resp. its gNB belongs.

User equipment UE camps at time to on base station sBS, belonging to the cellular network of operator C. Although signals from the base station BS of cell area C2 are retrieved at a higher signal strength than from base station sBS, the user equipment is camping on its current serving base station sBS due to the fact that it is eligible to operate only with base stations of the cellular network run by operator C. This is preferably the home cellular network of the user equipment. Usually this is predetermined through the SIM-card or UICC connectively coupled with the user equipment.

When the user equipment is moving at time $t_1$ to another location, the situation changes. As it can be seen, the cell area C1 is left, so the user equipment cannot retrieve signals from base station sBS sufficiently good. Through regularly measuring the signal strength, mobility management measures are taken, in particular checking which other cells are around. As it can be seen (dashed line $t_1$) at that time the user equipment receives signals on the same frequency range of unlicensed spectrum of four base stations, belonging to cells C3, C4, C5, C7.

For the user equipment it is now to choose which of the cells resp. base stations will be used for cell re-selection from the current serving base station.

In the common approach for that the S-Criterion is used, mainly taking into account the signal strength CS of the base station received at the antenna of the user equipment.

In this case this would mean that the base station of cell area C4 would be the best. However, cell area C4 belongs to Operator A. According to the credentials on the connected SIM card, the user equipment is not able to operate on base stations of that operator, rather on base stations of (serving) operator C.

In this example in worst case the user equipment would have to synchronize on up to 4 base stations, retrieve preferably the whole set of system information blocks SIBs etc. in order to figure out, if the candidate base station is appropriate for camping. During that time, no connection, no paging etc. is possible. Additionally this task is power consuming and may happen for a moving user equipment over and over again.

Hence the user equipment has a desire to find out with less efforts, which of the visible base stations at time $t_1$ is belonging to the same operator as the currently serving base station sBS.

Figure 2:
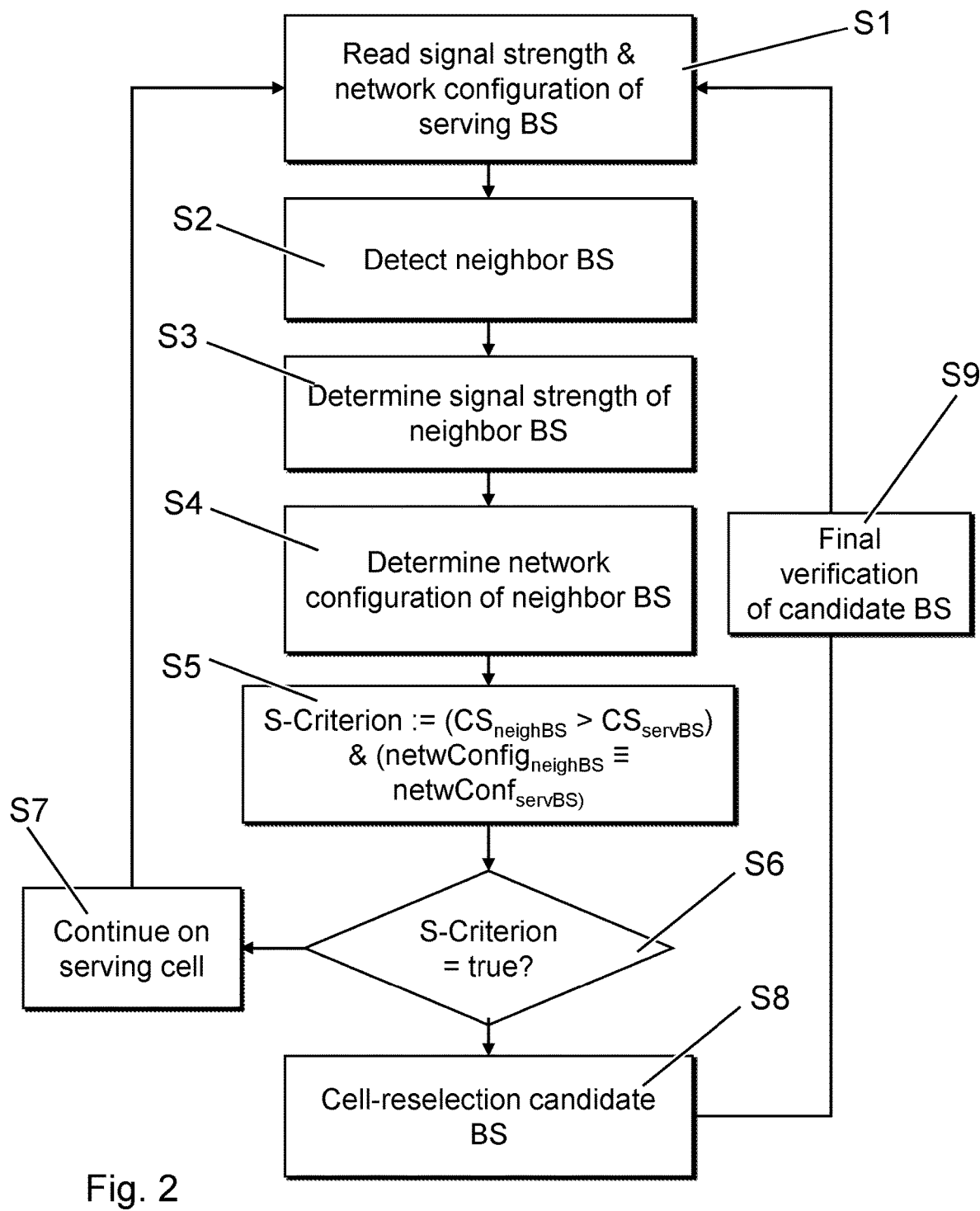
FIG. 2 represents a flow chart of an exemplifying embodiment of the inventive method.

A solution for that task according to an exemplifying embodiment of the invention is shown in the flow chart of FIG. 2.

It is assumed that the user equipment is already camping on a base station, where it is eligible for operating with. This is called the serving base station, regardless of the type of base station (eNB, gNB . . . ). Further the base station is operating in unlicensed spectrum, at least for paging etc.

In step S1 the user equipment determines certain parameter concerning the operation with the serving base station. This comprises the current signal strength received at the antenna of the user equipment. The signal strength is the transmitter power output received at an antenna, typically measured in dBm. For wireless cellular telecommunication various measures are taken for this value.

Another parameter to be determined in step S1 is at least one network configuration parameter. Such configuration parameters are in particular settings or any other type of characteristic, that are presumably characteristic for a cellular network.

Preferably the retrieved parameters are stored permanently or in volatile memory.

The next step S2 is usually carried out directly after step S1, but some lead time is also encompassed.

Here the user equipment tries to detect neighbor base stations, in particular those operating in the same unlicensed spectrum. For that the signals in that frequency range are evaluated and decoded. Further other frequency ranges may be considered as well.

The result of this operation is usually a list of candidate base stations, which signals were received sufficiently strong for decoding. Usually the serving base station is part of the candidate base station list. Preferably the signal strength of step S1 is detected or updated in the next step.

In step S3 the signal strength of the candidate base stations is determined. Typically for all following steps the list of candidate base stations is ordered in decreasing signal strength.

Hence in step S4 the network configuration of the candidate base stations, or at least to begin with the candidate base station with the highest received signal strength, is then determined. This typically requires analysis of the received signals or other characteristic behavior.

Based on the determined values the S-Criterion is then evaluated. The S-Criterion is a Boolean value indicating if a cell re-selection is to be carried out. In this case the S-Criterion is determined taking into account the previously determined values. It is first based on a comparison of the signal strength of the candidate neighbor base station $CS_{neighBS}$ and the signal strength of the serving base station $CS_{servBS}$. Only when the signal strength of the neighbor base station exceeds the signal strength of the serving base station, a cell re-selection is considered. Additionally typically a hysteresis, resp. a threshold is maintained, wherein the signal strength of the neighbor base station needs to be significantly larger than of the serving base station, in order to avoid ping pong and frequent cell re-selection. This protects the battery lifetime of the user equipment.

Should this condition apply, it is additionally figured out, if the network condition parameter of the neighbor base station netwConfig$_{neigBS}$ corresponds to the network condition parameter of the serving base station netwConfig$_{servBS}$.

With this comparison it is figured out, if the neighbor base station belongs to the same cellular network as the serving base station.

In the exemplifying embodiment both checks are carried out in one step S5. However a split of checks is further useful, as no further elaboration needs to be done, when the signal strength condition does not apply.

In step S6 the resulting S-Criterion is consequently checked. When the S-Criterion is true, then a cell re-selection to the examined neighbor base station is carried out in step S8. Otherwise it is continued with the serving base station in step S7.

Exactly S8 means when both criteria are fulfilled that the base station is considered as candidate for further re-selection evaluation i.e. The final verification is carried out in step S9, where SIB1 is read prior finally camping on said cell, means to evaluate if the base station is not barred, not belonging to same or equivalent PLMN or in any other means not usable by the user equipment. If this is not the case the next candidate base station is to be evaluated and selected as new serving cell.

In both cases the method flow branches again to the beginning, starting after a given time anew with the checks for better and appropriate neighbor cells. The general goal of the inventive method is to avoid being out of service, that means not pageable, e.g. in case of incoming calls. If the user equipment should try to access a neighbor base station which it is not eligible to operate with, then this could lead to a time period of non-reachability. This needs to be avoided.

Figure 3:
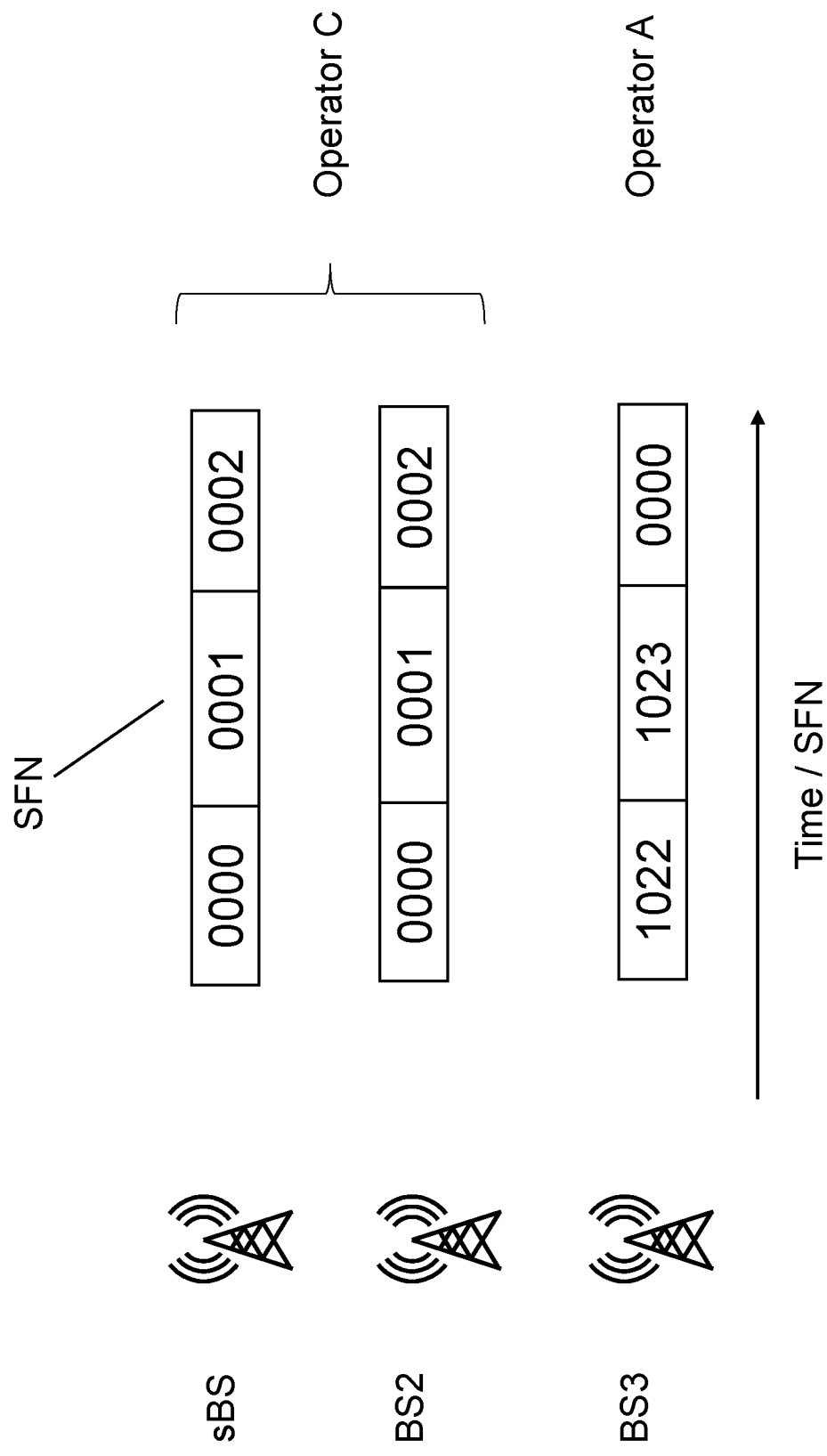
FIG. 3 shows in an exemplifying embodiment the configuration of frame synchronization of base stations from different cellular networks.

In FIG. 3 it is in particular considered a preferably usable network configuration which should be sufficiently accurate alone in order to figure out if the correct neighbor base station is found. The figure shows for three base stations sBS, BS2 and BS3 the system frame numbers (SFN) for a given time sequence. The system frame number is a value usually between 0 and 1023 which helps identifying system frames.

Base station sBS is the serving base station, the other two base stations BS2, BS3 are assumed as candidate base stations, having sufficient high signal strength at the user equipment camping on base station sBS.

For the user equipment it is now the task to figure out, which of the base stations BS2, BS3 is part of the same cellular network of the same operator as the serving base station sBS.

For this the SFN synchronization is considered. The SFN is transmitted as part of the Master Information Block MIB, which needs to be determined in each case before accessing a base station. Receiving the MIB is also part of the determination of the signal strength of the base station.

Hence, it requires no remarkable additional effort and time to determine the system frame numbers.

As it can be seen, the system frame number of base stations sBS and BS2 is identical, while BS3 has a completely different SFN at the same time.

Typically cellular networks are configured that way that all base stations have synchronized system frame numbers. Preferably as part of the detection of network parameter of the serving base station, the support of such synchronization of SFNs over the base station may be signaled by the serving base station to the user equipment.

As a matter of fact, the user equipment has based on the signal strength and the evaluation of the network configuration parameter SFN figured out, that a cell re-selection to base station BS2 is seamlessly possible and would consequently carry out that cell re-selection then.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for a user equipment (UE) for operating in a first cellular network supporting unlicensed spectrum access,
the user equipment (UE) camping on a first base station (sBS) of the first cellular network, the user equipment (UE) maintaining a first set of configuration parameters of the cellular network comprising data relating to frame numbering (SFN),
the method comprising for the user equipment (UE) the steps of:
measuring strength of signals (CS) transmitted by the first base station (sBS),
measuring strength of signals (CS) transmitted by at least one of a set of neighbor base stations operating in unlicensed spectrum,
determining a second set of configuration parameters comprising data relating to frame numbering (SFN) and corresponding to the cellular network that at least one second base station (BS) out of the set of neighbor base stations is part of,
considering said at least one second base station (BS) under the conditions:
the measured signal strength (CS) for said at least one second base station (BS) is higher than said measured signal strength (CS) of first base station (sBS), and
data relating to frame numbering (SFN) in said determined second set of configuration parameters corresponds to data relating to frame numbering (SFN) in said maintained first set of configuration parameters,
carrying out a cell selection to the at least one second base station (BS) when said conditions apply.

2. The method according to claim 1,
wherein the user equipment receives from the first base station (sBS) an indication that the base stations of the cellular network are operating frame synchronized.

3. The method according to claim 1,
wherein the set of configuration parameters comprises data relating to a distribution of reference signals over the frequency spectrum used by the first base station.

4. The method according to claim 1,
wherein the set of configuration parameters comprises the synchronization sequence of at least one of the primary synchronization channel and the second synchronization channel or a combination thereof.

5. The method according to claim 4,
comprising the step of receiving from the first base station (sBS) information relating to an intra-frequency neighbor cell list comprising a plurality of synchronization sequence combinations used by neighbor base stations belonging to the same cellular network as the first base station (sBS).

6. The method according to claim 1, where a difference in SFN is derived by most significant bits of the SFN contained in a MIB.

7. The method according to claim 1, where a matching in SFN is when most significant bits in the MIB, being the SFN part, and least significant bits derived from a BCH modification period contained in further broadcast information are matching.

8. The method of claim 1, wherein the method includes the steps of:
retrieving the second set of configuration parameters prior to camping on said neighboring base station, said retrieving prior to said step of determining a second set of configuration parameters;
then, synchronizing on a synchronization channel of said neighboring base station to read a Master Information Block (MIB) of a System Information Block (SIB) before said step of considering said at least one second base station (BS) under the conditions,
and, wherein said aforementioned step of carrying out said cell selection comprises:
decoding the SFN from most significant bits (MSBs) of the MIB, said SFN excluding two (2) least significant bits (LSBs) of the SFN that are instead derived from a BCH modification period;
using only said most significant bits of the SFN read from the MIB for a priori elimination of base stations for carrying out said cell selection to the at least one second base station (BS) when said conditions apply, and thereafter camping on said neighboring base station after said cell selection, thereby circumventing a whole reading of said System Information Block (SIB) containing the MIB that is otherwise needed to evaluate if said neighboring base station belongs to a Public Land Mobility Network (PLMN) identity provided as part of the MIB before said camping occurs on said neighboring base station.

9. A user equipment (UE) for operating in a first cellular network supporting unlicensed spectrum access, the user equipment being configured to camp on a first base station (sBS) of the first cellular network,
and to maintain a first set of configuration parameters of the cellular network comprising data relating to frame numbering (SFN),
wherein the user equipment is further configured to:
measure strength of signals (CS) transmitted by the first base station (sBS), measure strength of signal (CS) transmitted by at least one of a set of neighbor base stations operating in unlicensed spectrum, determine a second set of configuration parameters comprising data relating to frame numbering (SFN) and corresponding to the cellular network that at least one second base station (BS) out of the set of neighbor base stations is part of, consider said at least one second base station (BS) under the conditions:

the measured signal strength (CS) for said at least one second base station is higher than said measured signal strength (CS) of first base station (sBS), and data relating to frame numbering (SFN) in said determined second set of configuration parameters corresponds to data relating to frame numbering (SFN) in said maintained first set of configuration parameters, carry out a cell selection to the at least one second base station (BS) when said conditions apply.

10. The user equipment (UE) according to claim 9, further configured to receive from the first base station (sBS) an indication that the base stations of the cellular network are operating frame synchronized.

* * * * *